(12) United States Patent
Sayce et al.

(10) Patent No.: US 6,763,682 B1
(45) Date of Patent: Jul. 20, 2004

(54) PROCESS AND APPARATUS FOR MANUFACTURING A GLASS INGOT FROM SYNTHETIC SILICA

(75) Inventors: Ian George Sayce, Stocksfield (GB); Peter John Wells, Gateshead (GB)

(73) Assignee: Saint-Gobain Quartz PLC, Walisend (GB)

( * ) Notice: Subject to any disclaimer, the term of this patent is extended or adjusted under 35 U.S.C. 154(b) by 0 days.

(21) Appl. No.: 09/743,623

(22) PCT Filed: Jul. 15, 1999

(86) PCT No.: PCT/GB99/02278

§ 371 (c)(1),
(2), (4) Date: Feb. 2, 2001

(87) PCT Pub. No.: WO00/03955

PCT Pub. Date: Jan. 27, 2000

(30) Foreign Application Priority Data

Jul. 15, 1998 (GB) ............................................... 9815357

(51) Int. Cl.⁷ .......................... C03B 20/00; C03B 19/14
(52) U.S. Cl. .......................... 65/17.4; 65/17.6; 65/126; 65/144; 65/187; 65/325
(58) Field of Search ................................. 65/17.3, 17.4, 65/17.6, 66, 86, 126, 129, 144, 187, 188, 221, 324, 325, 413, 435

(56) References Cited

U.S. PATENT DOCUMENTS 4,923,497 A * 5/1990 Leber et al. ................... 65/86

5,364,432 A * 11/1994 Leber .......................... 65/17.3

FOREIGN PATENT DOCUMENTS

| FR | 1.363.233 A | 5/1964 |
| JP | 63288906 A | 11/1988 |
| JP | 63319220 A | 12/1988 |
| JP | 01009823 A | 1/1989 |
| JP | 64003027 A | 1/1989 |
| JP | 64003028 A | 1/1989 |
| WO | WO97/10182 A | 3/1997 |
| WO | WO97/10183 A | 3/1997 |

OTHER PUBLICATIONS

H. Tsutomu et al, "Continuous Production Unit for Silicic Acid", Japanese Publication No. 61178415, published Aug. 11, 1986 (Abstract only).

* cited by examiner

Primary Examiner—Sean Vincent
(74) Attorney, Agent, or Firm—Howson and Howson

(57) ABSTRACT

A method and apparatus for the manufacture of synthetic vitreous silica ingots involves the production of a melt of synthetic vitreous silica in a crucible (35) within a refractory furnace (31), and the continuous withdrawal of an ingot (43) through an orifice (40) in the wall of the crucible. The silica may be deposited in the crucible by a synthesis burner (33), which may also serve to maintain the silica above its sintering temperature. The emerging ingot is supported by an arrangement of moveable clamps (44).

14 Claims, 4 Drawing Sheets

PROCESS AND APPARATUS FOR MANUFACTURING A GLASS INGOT FROM SYNTHETIC SILICA

Fused quartz glasses, typically made by fusion of refined natural quartz crystal powders, are widely used in the optical, optical fibre and semiconductor industries for their optical properties, chemical resistance, thermal stability or other properties.

In some critical applications, the impurities or inhomogeneities resulting from the use of a natural crystal feedstock may be unacceptable, and then it becomes necessary to substitute a synthetically produced material. Sometimes this may be a synthetically produced powder, but more generally the nighest grade vitreous silica products are made by vapour deposition. Thus a vaporised precursor compound of silicon is fed to a synthesis flame where it is oxidised or hydrolysed to form a stream of silica fume or a flow of micro-particles of silica which is caused to deposit either as a porous silica soot body, which may be dehydrated or doped by heating in a suitable atmosphere, and then sintered to pore-free glass, or alternatively by deposition at such a temperature that the silica deposit sinters directly to a transparent glass.

The latter process, often called the direct deposition process, yields glass of relatively high OH (hydroxyl content), typically 800–1200 ppM by weight, but this is acceptable for many applications, for optical components such as prisms, lenses etc., For larger articles such as windows of furnaces or spacecraft etc., for mirrors, and for the manufacture of photomasks, i.e., the plates which carry the images to be imprinted by a photolithographic process on a silicon wafer, during the manufacture of microcircuits.

The direct deposition process may be operated in either of two modes. In the first of these, shown in FIG. 1 of the accompanying drawings, a burner 11 provides a synthesis flame 12, typically an oxy-hydrogen flame, and is fed, via a central duct 11*a* with a stream of precursor material. The precursor material can be one or more gaseous chlorosilanes, (e.g. silicon tetrachloride), but more recently chlorine-free precursors have been finding favour. The silicon compound is oxidised or hydrolysed to form a stream of silica fume or a flow of micro-particles of silica which is directed on a substrate forming the domed end 13*a* of a rotating cylindrical ingot 13, supported within a furnace structure 14. A substantial proportion of the silica generated in the flame deposits on the substrate which is slowly withdrawn (in direction Z) from the furnace, preferably maintaining a substantially constant burner-to-substrate distance. The silica is deposited on the substrate at such a temperature that it sinters directly to transparent, pore-free glass. The ingot may be rotating about a horizontal, vertical or other axis, and may be subjected to oscillatory movement on either or both axes (X and/or Y) perpendicular to that of rotation to spread the thermal load on the ingot end 13*a*, and thus to increase the homogeneity of the glass deposited or to control the cross-sectional shape of the ingot.

A second geometrical arrangement used for collecting glass by direct deposition is shown in FIG. 2 of the accompanying drawings. This employs a rotating shallow refractory crucible 21, typically lined with zircon or zirconia-based refractory bricks, mounted on a turntable 22. The bottom of the shallow crucible is typically lined initially with a layer of high purity quartz or quartz glass powder 23, or alternatively crushed synthetic vitreous silica glass for maximum purity. Over this crucible is mounted a refractory roof 24 which carries one or more synthesis burners 25. The crucible may be between 1 and 2 meters in diameter and under these circumstances a significant number of burners may be employed. These serve both to heat the crucible to a temperature above the melting point of silica, and also as generators of synthesis flames 26, each of which deposits a stream of silica fume or soot on the surface of a molten glass pool 27 which is generated in the crucible. After an appropriate thickness of glass has been so generated, the crucible is allowed to cool, the refractory walls are removed, and the disk-shaped ingot of glass is taken away to be cut, machined or otherwise formed into the required shape.

The process of FIG. 1 can be used to generate a cylindrical (e.g. circular cylindrical) ingot. This may be of a size suitable for conversion into cylindrical sections if required, e.g., for lenses or mirror blanks, or may be converted by further thermal processes to rod or tube products. However for some applications a cylindrical shape may be an unsuitable starting material. Thus for certain applications where a series of square or rectangular products is required, for example for photomask substrates, these are either machined from an oversize ingot, with evident wastage, or alternatively the cylindrical ingot is re-shaped, for example by heating to softening temperature within a graphite mould of appropriate internal dimensions and, by slumping under its own weight, or by application of pressure, to force the softened silica to take up the shape of the mould. After cooling, the re-shaped ingot may be cut into slices of the desired dimensions. This secondary operation is costly and results in material losses.

Where such shapes are to be cut from one of the large disk-shaped ingots generated by the crucible process of FIG. 2, this involves extensive cutting operations, and again much wastage. It may also be necessary to reject material of unsatisfactory quality, due, for example, to contamination from the refractories of the furnace roof, or from the crucible itself.

Thus for certain shapes of product, notably those of square cross-section, neither of the two major manufacturing methods yields an ingot which may be used directly, and with high materials efficiency. Furthermore neither permits continuous operation as would be desirable for more economical operation, since both are essentially batch processes.

There is thus a requirement for a direct deposition process for synthetic vitreous silica glass, which can be operated continuously and which will generate an ingot of predetermined cross-sectional dimensions, i.e., round, square, rectangular, or other.

This invention seeks to meet that requirement by providing an improved method of forming a shaped body of synthetic vitreous silica glass and an improved furnace For the manufacture of such a shaped body.

According to one aspect of the invention a method of forming a shaped body of synthetic vitreous silica glass includes the steps of generating a mass of molten synthetic silica in a refractory container, part of the boundary of which defines a shaping orifice, and removing the generated synthetic silica from the container through the orifice as a shaped ingot.

The refractory container (e.g. a crucible) is desirably contained within a refractory furnace enclosure. The silica within the container may be kept above sintering temperature by one or more burners, which may conveniently be supported by the roof of the furnace enclosure so that the flame of the or each burner is directly downwardly towards the crucible. Preferably, the synthetic silica is produced by vapour deposition, in which case at least one of the burners should be a synthesis burner. Alternatively, pre-synthesised silica may be supplied to the crucible, for example in the form of powder, crystal or amorphous grain.

Conveniently the shaping orifice is located at the lowest part of the mass in the crucible and the removal involves positively withdrawing the ingot from below, preferably at a rate substantially similar to that at which synthetic silica is being added to the mass.

Preferably, the burner(s) serve(s) both to generate the synthetic silica in particulate form and to heat the melt so that the silica sinters directly to glass in the mass. Optionally additional heat may be imparted by further heating means.

According to a further aspect, the invention provides a furnace for the manufacture of a synthetic vitreous silica ingot, the furnace comprising: a furnace enclosure housing a refractory container, the refractory container being adapted to hold a melt of synthetic vitreous silica; one or more burners extending into the furnace enclosure and adapted in operation to maintain vitreous silica within said container at or above its sintering temperature; a die disposed within a wall of said container, the die including an orifice through which the glass ingot is extruded; and an arrangement of moveable clamps downstream of the orifice, adapted to support the extruded ingot.

Preferably, at least one burner is a synthesis burner, adapted both to deposit synthetic vitreous silica into the refractory container (e.g. crucible) and to assist in maintaining such silica above its sintering temperature. In such an arrangement, the apparatus also includes means to feed oxygen, fuel and silicon-containing precursor material to the or each synthesis burner.

Optionally, the crucible with its die, the ingot and the arrangement of clamps may be rotated synchronously to provide a deposited glass of improved homogeneity.

Again optionally, the crucible with its die, the ingot and the arrangement of clamps may be moved to and fro horizontally in an x-direction, or alternatively in orthogonally disposed x- and y-directions, to permit spreading of the pattern of deposited glass from the one or more burners.

Alternatively a spreading of the pattern of deposited silica can be achieved by like movement of the burner array and the furnace enclosure.

DETAILED DESCRIPTION OF THE PREFERRED EMBODIMENTS

Figure 1:
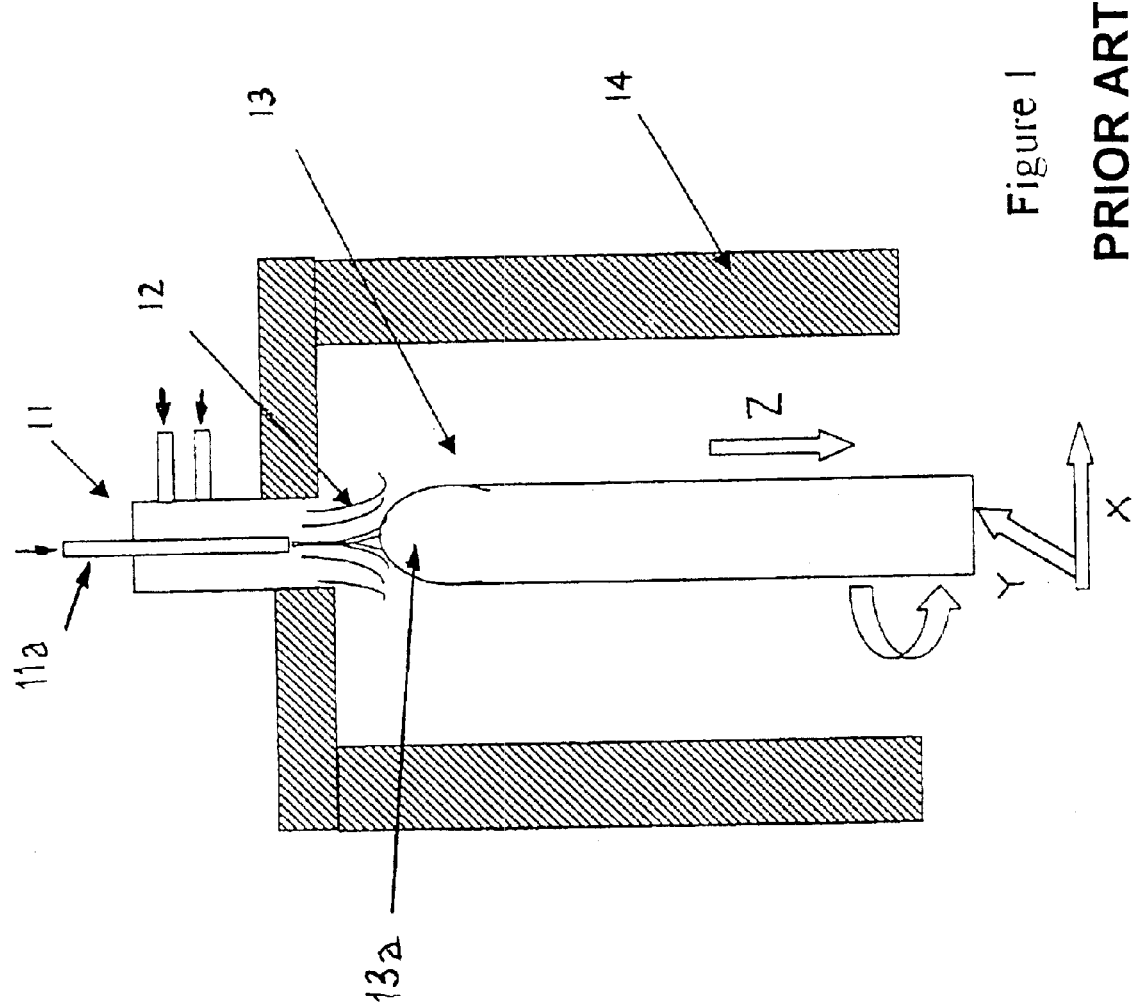
FIG. 1 is a schematic view of a prior art apparatus for directly depositing synthetic silica on a glass ingot.
Figure 2:
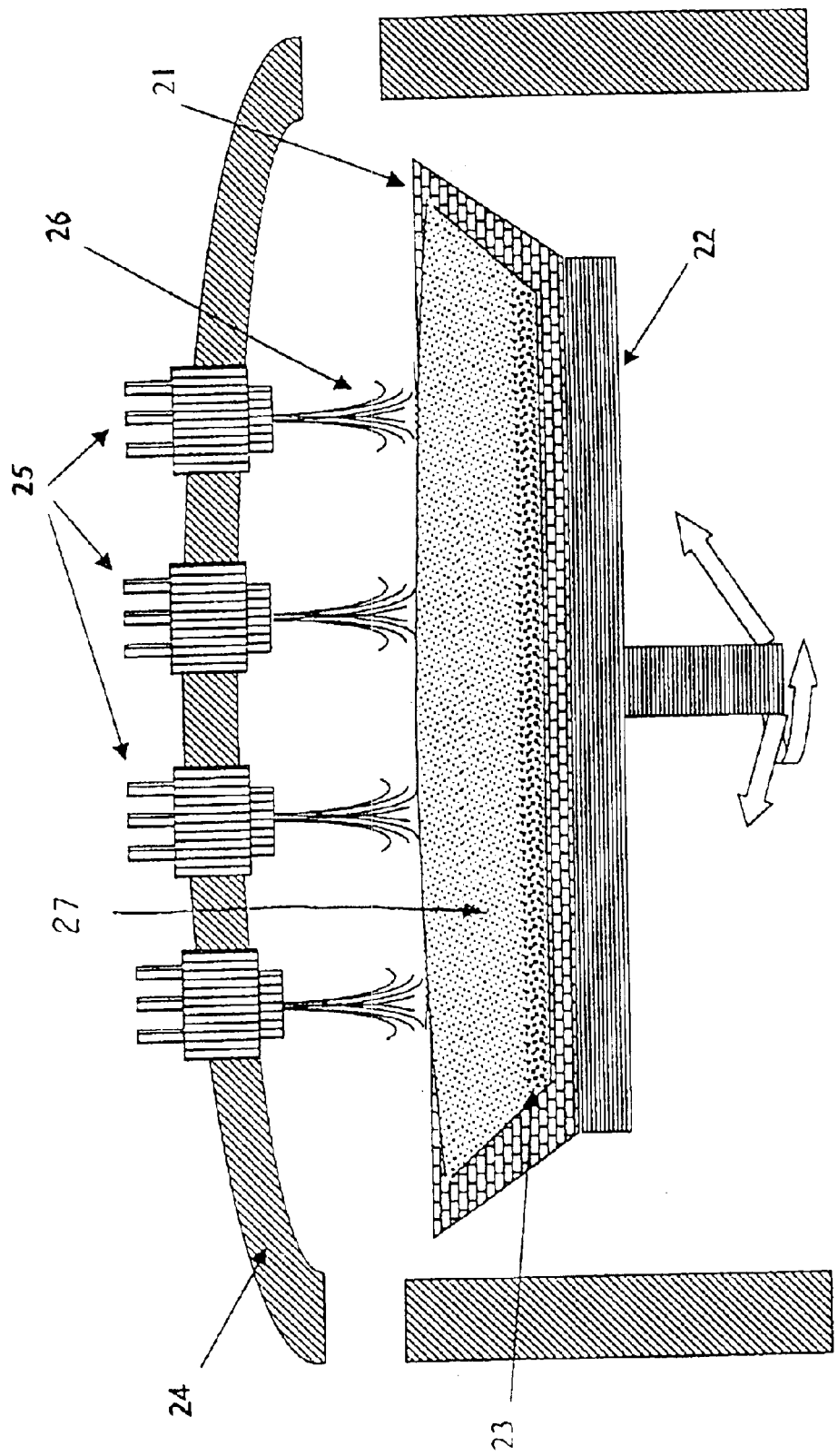
FIG. 2 is a schematic view of a prior art apparatus for directly depositing synthetic silica on a pool of molten glass.
Figure 3:
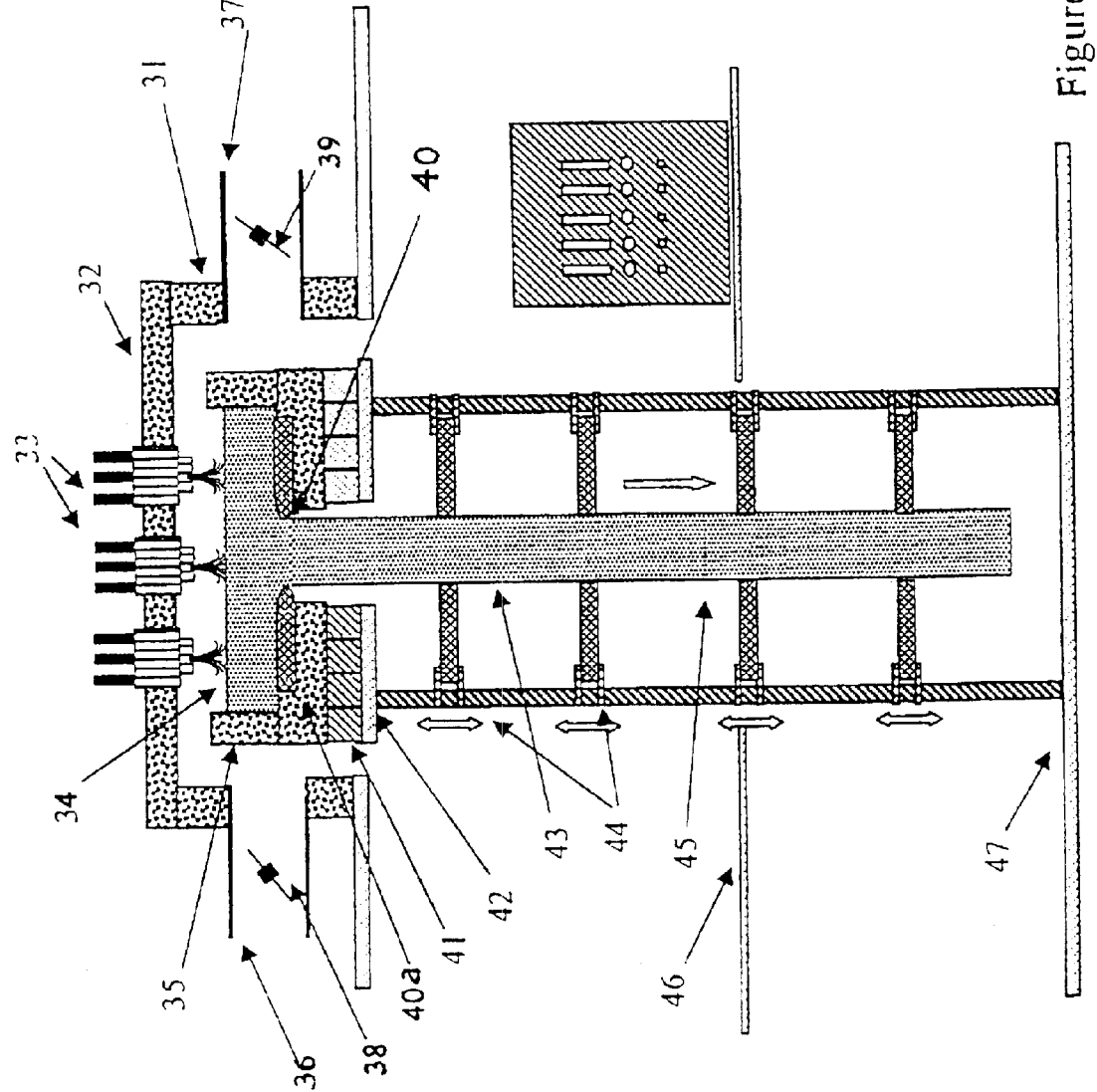
FIG. 3 is a schematic view of a first embodiment of an apparatus for manufacturing a glass ingot from synthetic silica according to the present invention.
Figure 4:
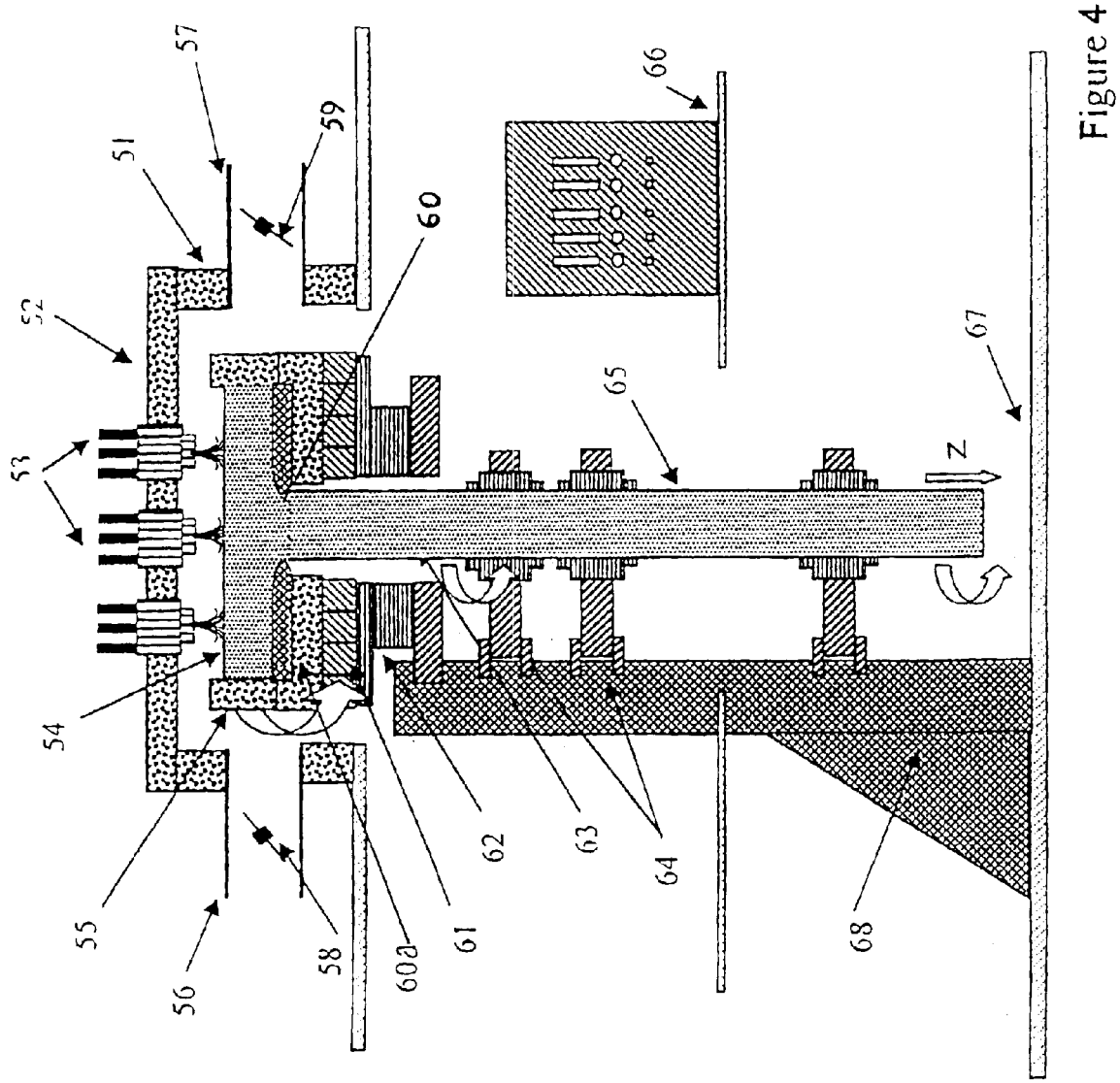
FIG. 4 is a schematic view of a second embodiment of an apparatus for manufacturing a glass ingot from synthetic silica according to the present invention.

The invention will now be more fully described, by way of example, with reference to FIGS. 3 and 4 of the accompanying drawings.

In one embodiment of the invention, as illustrated in FIG. 3, the apparatus comprises a furnace enclosure 31 lined with refractory brick and supporting a roof 32 also made of suitable refractory material. One or more burners 33, project through this roof. These burners may be made from metal or quartz glass, and are fed with a fuel gas (e.g., hydrogen, and/or natural gas etc), with oxygen, and with the vapour of an appropriate compound of silicon, which on oxidation and/or hydrolysis yields a stream of micro-particles of silica fume, which stream is directed at the surface of a mass 34 of glass melt contained in a refractory container or crucible 35.

The precursor material can be silicon tetrachloride or other halosilane, in which case the product gases contain the noxious and corrosive by-products, hydrochloric acid and chlorine. These must be handled with care, and scrubbed with appropriate gas-cleaning equipment before release to atmosphere. Alternatively, if the precursor material is a chlorine-free silicon compound such as a siloxane or alkoxysilane, then the product gases contain only carbon dioxide, water vapour, and uncollected silica fume, and effluent treatment is greatly simplified.

There exists a wide range of potential siloxanes which may be used in the burners 33, but preferred siloxanes are the polydimethylsiloxane, including the linear polymethylsiloxanes hexamethyldisiloxane, and the cyclic polymethylsiloxanes octamethylcyclotetrasiloxane (OMCTS) and decamethylcyclopentasiloxane (DMCPS). Of the variety of alkoxysilanes which may alternatively be used, one of the preferred precursors is methyltrimethoxysilane (MTMS).

As an alternative, synthetic vitreous silica (for example produced from any of the abovementioned precursor materials) may be supplied directly to the crucible in the form of powder, crystal or amorphous grain, rather than being deposited there by a synthesis burner.

The product gases are led from the furnace via exhaust ducts 36, 37, their flow being controlled by means of valves 38, 39.

As noted, the refractory enclosure 35 serves as a crucible to contain the glass melt, and in the base of this crucible is an orifice 40 which may be defined by a die brick, or other die assembly 40a, constructed to form an exit which serves as a continuous casting nozzle through which molten glass is progressively drawn in the course of the process. This die brick or die assembly may be made of a refractory material similar to that used to line the vessel 35, or may be made from another refractory material selected for improved erosion resistance, or may even be made from a refractory metal, optionally protected by a ceramic coating (e.g., molybdenum, coated with molybdenum disilicide). If a refractory metal die orifice is used, it is preferable to surround any exposed metal (e.g., the underside of the lip of the die) with a reducing gas, such as a hydrogen-nitrogern gas mixture.

Crucible 35 is supported, via appropriate insulating bricks 41, on a fixed base plate 42.

Beneath the orifice 40 depends a glass ingot 43, supported by a series of moveable clamps 44, which are designed during normal operation to move progressively downwards encouraging withdrawal of melt from crucible 35 at a selected rate, (e.g. corresponding to the rate at which synthetic silica glass is deposited from above by the array of burners 33. At intervals, each one of these clamps may be caused to release its grip from the ingot, and independently be driven upwards to the upper limit of its motion, before being adjusted once again to grip the descending ingot. In this way the clamps cycle up and slowly down, and the glass ingot is maintained under steady motion downwards. By ensuring that at all times the ingot is gripped by at least two clamps, the ingot is maintained entirely straight.

At intervals, a length of the glass ingot 43 may be cut off from its lower end, e.g., at point 45 accessible from mid-floor level 46, and then lowered to ground floor level 47, where it is released and removed for further processing.

By selecting the dimensions of the orifice 40 it is possible in this way continuously to form synthetic vitreous silica ingot of predetermined cross-section and dimensions. Thus it is possible to make cylindrical ingot, or ingot of square or rectangular cross-section, and even to extrude a rectangle of high aspect ratio, i.e., plate. While for simplicity the base of crucible 35 is shown as substantially flat in FIG. 3, for some applications it may be preferable to have an alternative shape, e.g., frusto-conical, to facilitate the flow of the glass to the orifice 40, to ensure an appropriate temperature distribution at the walls of the vessel, and to minimise devitrification at the walls, or around the orifice, which might otherwise affect the dimensions of the extruded ingot.

The process depicted in FIG. 3 can be commenced as follows. The crucible 35 is assembled on the base plate 41, and a die assembly 40a is inserted. A previously manufactured ingot is raised via the clamps 44 into the orifice 40. This ingot may be machined if necessary to be an exact fit in the die orifice, and serves as a "bait-piece". The base of the crucible is covered with previously manufactured synthetic vitreous silica (e.g. in the form of lumps of glass). The furnace is brought to temperature by heating with the burner array, causing the initial furnace fill to melt and fuse to the upper end of the protruding bait-piece. Precursor material is then fed to the burners and, as deposition of glass proceeds, the melt level in the crucible 35 rises. When the desired melt depth is achieved, ingot retraction is commenced by starting the Progressive downward motion of the cramps 42. Manufacture of ingot then continues as a steady process, with ingot withdrawal at least substantially matching glass deposition rate, and with ingot sections being cut off and removed at intervals as required (e.g. regular intervals).

The process depicted in FIG. 3 is convenient for many applications requiring a glass ingot of high purity and controlled dimensions. However, as depicted, the crucible 35 is stationary, and it is evident that each burner 33 is directed at a fixed area of the surface of the melt. Glass deposited in this region thus has a slightly different hydroxyl level than that deposited elsewhere, in cooler regions. If a chlorine-containing precursor material is used, then the chlorine content of the glass will be higher in the region of impact of each synthesis flame. These effects can result in minor inhomogeneities in the chemical properties and also in the refractive index of the glass ingot. For this reason it may be desirable to rotate the crucible 35 and ingot 43 in the course of the process and this is achieved via a development of the process, shown in FIG. 4.

In this case the apparatus comprises a furnace enclosure 51, lined with refractory brick, and supporting a roof 52, also made of suitable refractory material. One or more burners 53 project through this roof. These burners may be made of metal or quartz glass, and are fed with fuel gases, oxygen, and precursor vapour as described above.

The product gases are led from the furnace via exhaust ducts 56, 57, their flow being controlled by means of valves 58, 59.

Again the product glass is collected in a refractory vessel or crucible assembly 55 in the base of which is disposed a shaping orifice 60, defined by a refractory die 60a made of one or more bricks, or alternatively a refractory metal plate as described above. The crucible assembly 55 is again supoorted on insulating bricks 61 and on a base plate 62, but in this case base plate 62 comprises a turntable, which is maintained at constant height, but is capable of rotation about a vertical axis.

Beneath the shaping orifice 60, depends a glass ingot 63, supported by a series of rotating chucks 64, which are designed to rotate synchronously with the crucible assembly 55, and turntable 62, but are also capable of progressive advance in a downward direction, all chucks moving at identical speed, thus permitting withdrawal of melt from the crucible assembly 55 at a chosen rate (preferably a constant rate, corresponding to the rate at which synthetic silica glass is deposited by the array of burners above).

Again, as previously, each ore of these chucks 64 may be caused to release its grip from the ingot 63, and can then be independently driven upwards to the upper limit of its motion, before being adjusted once again to grip the descending ingot. In this way the chucks 64 cycle up and slowly down, while rotating at constant speed, and the glass ingot is maintained with constant rotation and steady motion downwards. By using twin-jawed chucks 64 it is possible to ensure that the ingot 65 is maintained entirely straight.

At intervals, a length of glass ingot may be cut off, e.g., at point 65, at mid-floor level 66, and then lowered to ground floor level 67, where it is released and removed for further processing.

Again, by selecting the dimensions of the shaping orifice 60, it is possible continuously to form a synthetic vitreous silica ingot of predetermined cross-section and dimensions. Thus it is possible to make a circular cylindrical ingot, or an ingot of square or rectangular cross-section, and even to extrude an ingot whose cross-section is a rectangle of high aspect ratio, i.e., plate. While for simplicity the base of the crucible assembly 55 is shown as substantially flat in FIG. 4, for some applications it may be preferable to have an alternative shape, e.g., frusto-conical, to facilitate the flow the glass to the shaping orifice 60, to ensure an appropriate temperature distribution at the walls of the vessel, and to minimise devitrification at the walls, or around the orifice 60, which might otherwise affect the dimensions of the extruded ingot.

Because of the rotation of the crucible assembly 55, the burners 53 are depositing on a continuously moving surface, and this avoids overheating of any localised area on the glass surface, enhances the deposition efficiency and enables a substantial increase in homogeneity of the glass deposited in the crucible assembly to be achieved. Additionally, the progressive motion of the glass through the crucible assembly to the orifice 60, permits mixing and diffusion processes which further enhance the homogeneity of the glass product.

An installation comprising the turntable 62, and the moving chucks 64, can be considered to be a large vertically-oriented lathe, of which the bed comprises a tower assembly 68. For the ultimate in homogeneity, it is possible to cause the supporting tower 68 to move horizontally to and fro in an x-direction, or even in both x- and y-directions these directions being mutually at right angles and at right angles to the direction Z of ingot withdrawal, but this is unnecessary for most applications of the glass ingot product. Alternatively, it is possible in principle to cause the furnace roof/burner assembly to oscillate slowly in the x-direction, and potentially in the x- and y-directions, to effect the same homogenisation process.

The choice of refractories is clearly important for successful operation of this type of process. In general high quality zircon refractories have proved adequate, but high purity is necessary to minimise contamination, especially when using chlorine-free precursors. Greater erosion resistance is however achieved when using yttria stabilised zirconia refractories, the added expense of which is justified by the increased longevity of the furnace components, and the efficiency of the process in enabling the manufacture on a continuous basis of an ingot of the required cross-section and dimensions.

What is claimed is:

1. A furnace for the continuous manufacture of synthetic vitreous silica glass ingot, the furnace comprising:
   a furnace enclosure housing a refractory container, the container being adapted to hold a melt of synthetic vitreous silica;
   a die disposed within a wall or base of the container, the die including an orifice through which the glass ingot is extruded;
   moveable support means downstream of the orifice, adapted to support and facilitate withdrawal of the ingot; and
   one or more burners adapted to maintain said melt of synthetic vitreous silica in said refractory container above its sintering temperature, at least one burner being a synthesis burner for depositing synthetic vitreous silica by vapour deposition onto a surface of the melt and having associated means for supplying silica precursor and combustion gases;
   said die and moveable support means being arranged to enable continuous withdrawal of synthetic vitreous silica as an ingot of predetermined cross-sectional dimensions, defined by dimensions of said die orifice, at a rate substantially similar to that at which silica is deposited by said synthesis burner.

2. The furnace according to claim 1, wherein the moveable support means comprises an arrangement of moveable clamps.

3. The furnace according to claim 2, wherein the refractory container with its die, the ingot and we arrangement of clamps are rotatable synchronously to provide a deposited glass of improved homogeneity.

4. The face according to claim 2, wherein the refractory container with its die, the ingot and the arrangement of clamps are moveable to and fro horizontally to spread a pattern of deposited glass from the burner.

5. The furnace according claim 2, wherein the refractory container with its die, the ingot and the arrangement of clamps are moveable in orthogonally disposed x- and y-directions, to spread a pattern of deposited glass from said burner.

6. The furnace according to claim 1, wherein a least one of said burner and said refractory container are moveable to achieve spreadng of a pattern of deposited silica.

7. A furnace according to claim 2, wherein said arrangement of moveable clamps continuously grips the ingot with at least two clamps at all times to maintain straightness of an emerging ingot.

8. A furnace according to claim 1, wherein said die orifice is made from a refractory metal and is protected by a flow of reducing gas.

9. A furnace according to claim 1, wherein said die orifice is made from yttria-stabilized zirconia.

10. A method of continuously forming synthetic vitreous silica glass ingot, comprising the steps of:
    generating a melt of silica contained in a refractory container, part of a boundary of which defines a die orifice;
    maintaining the melt in a molten state by heating the melt with one or more burner including a synthesis burner;
    depositing synthesis vitreous silica form said synthesis burner by vapor deposition onto a surface of the melt; and
    withdrawing synthesis vitreous silica as an ingot of predetermined cross-sectional dimensions, defined by dimensions of said die orifice, at a rate substantially similar to that at which silica is deposited by said synthesis burner.

11. A method according to claim 10, wherein a silica precursor is supplied to said synthesis burner, and wherein said silica precursor is a chlorine-free compound of silicon.

12. A method according to claim 11, wherein the silica precursor is selected from the group consisting of hexamethyldisiloxane, octamethylcyclotetrasiloxane, decamthylcyclopentasiloxane, and methyltrimethoxysilane.

13. The method according to claim 10, wherein the die orifice is located at a lowest part of a mass in the refractory container and wherein said withdrawing step comprises positively withdrawing the ingot from below the refractory container.

14. The method according to claim 10, wherein the synthesis burner heats the surface of the melt so that the deposited silica sinters directly to glass.

* * * * *

UNITED STATES PATENT AND TRADEMARK OFFICE
CERTIFICATE OF CORRECTION

PATENT NO. : 6,763,682 B1
DATED : July 20, 2004
INVENTOR(S) : Sayce et al.

It is certified that error appears in the above-identified patent and that said Letters Patent is hereby corrected as shown below:

Column 1,
Line 15, "the nighest grade" should read -- the highest grade --

Column 4,
Line 19, "the polydimethylsiloxane," should read -- the polymethylsiloxanes --

Column 5,
Line 30, "the Progressive downward" should read -- the progressive downward --
Line 30, "of the cramps" should read -- of the clamps --
Line 64, "supoorted on insulating" should read -- supported on insulating --

Column 6,
Line 10, "each ore of these" should read -- each one of these --

Column 7,
Line 20, "one burner" should read -- one said burner --
Line 35, "and we arrangement" should read -- and the arrangement --
Line 38, "The face according" should read -- The furnace according --
Line 40, "to and fro" should be deleted
Line 40, "horizontally to" should read -- horizontally in an x-direction to --

Column 8,
Line 21, "silica form said" should read -- silica from said --
Line 25, "withdrawing synthesis" should read -- withdrawing synthetic --

Signed and Sealed this

Thirtieth Day of November, 2004

JON W. DUDAS
*Director of the United States Patent and Trademark Office*